Patented Jan. 6, 1925.

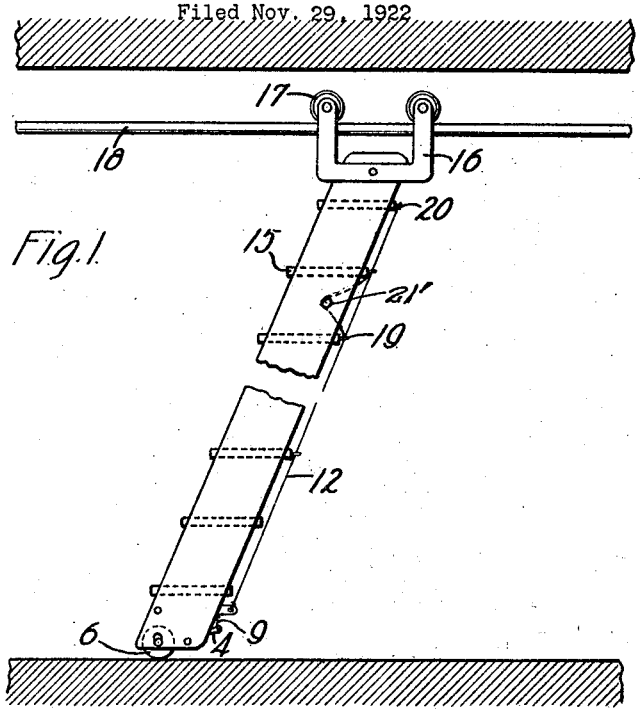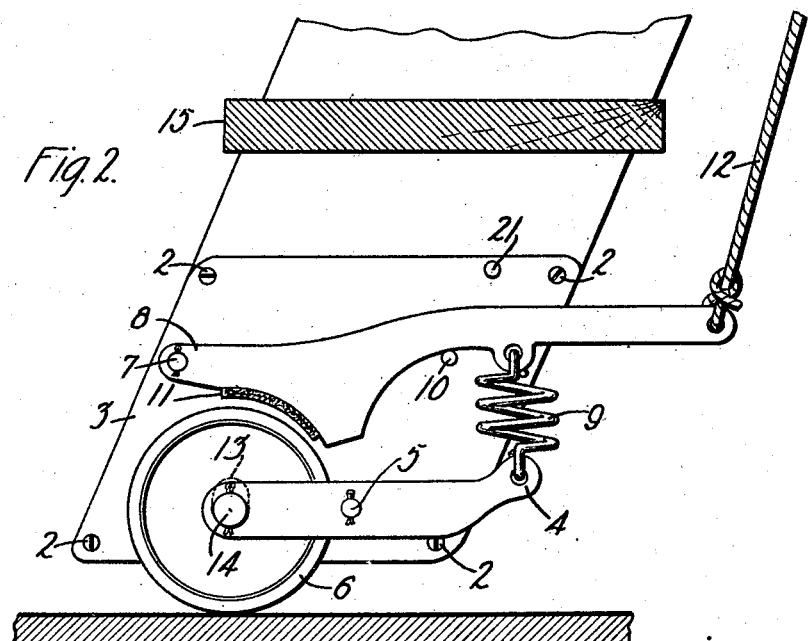

1,522,299

UNITED STATES PATENT OFFICE.

LEON N. HAMPTON, OF NEW YORK, N. Y., ASSIGNOR TO WESTERN ELECTRIC COMPANY, INCORPORATED, OF NEW YORK, N. Y., A CORPORATION OF NEW YORK.

BRAKE FOR ROLLING LADDERS.

Application filed November 29, 1922. Serial No. 603,942.

*To all whom it may concern:*

Be it known that I, LEON N. HAMPTON, a citizen of the United States, residing at New York, in the county of New York, State of New York, have invented certain new and useful Improvements in Brakes for Rolling Ladders, of which the following is a full, clear, concise, and exact description.

This invention relates to rolling ladders, and more particularly to what are known as store service ladders used in telephone exchanges, stores, etc., having supporting wheels at or near the bottom of the ladder.

The object of this invention is the provision of braking means for a rolling ladder of this type. This object is attained in accordance with a feature of the invention by providing a brake which is automatically applied to one or both of the lower or supporting wheels when the operator steps on the ladder.

In accordance with another feature of the invention in order to make it possible for the operator to release the brake and shift the position of the ladder while standing thereon, means are provided for releasing the brake.

The invention will be more clearly understood by reference to the accompanying drawings, Fig. 1 of which shows a rolling ladder of the class described, which for convenience, will be assumed as being of the usual type, consisting of two side pieces between which steps 15 are mounted, which is pivotally supported at the upper end from a U-shaped member 16 having rollers 17 adapted to run on a trolley 18. Fig. 2 shows in greater detail the lower end of the ladder and the braking arrangement which is the principal feature of the invention.

Secured at the bottom of the ladder by means of screws 2 is a plate 3 upon which is pivotally mounted a curved member 4 pivoted at 5 and carrying at one end a roller or wheel 6. Also pivoted to the plate 3 is the brake member 8 which tends to approach or engage with the wheel 6 under the action of a tension spring 9 which is connected between the brake member 8 and the end of the member 4 which is opposite to the end carrying the roller 6, this spring being strong enough to support the weight of the ladder alone, thus retaining the wheel 6 in its extreme downward position. In the plate 3 is a curved slot 13 into which the shaft 14 of the wheel 6 projects which is adapted to limit the up and down movement of the wheel. The brake member 8 is prevented from engaging the roller 6 when in this position by the action of the stop 10. When, however, the weight of the operator is applied to the ladder, the plate 3 is forced downward against the action of the spring 9 so that the roller 6 engages the shoe portion 11 of the brake member 8 with sufficient force to prevent further rolling movement of the ladder. In case, however, the operator while standing on the ladder desires to release the brake for the purpose of shifting the position of the ladder, a cord 12 is attached to the brake 8 and runs through guides 19 on the back to the top of the ladder to which it is fastened as of 20, so that when the cord is pulled by the operator the brake is withdrawn from the wheel 6. The stop 21 is positioned to limit the upward movement of the brake. In case the operator desires to hold the brake out of engagement for any length of time, any suitable holding device such as a pin 21 can be provided.

What is claimed is:

1. The combination with a roller ladder having wheels at the bottom, of a brake acting on one of said wheels and actuated by the weight of the operator on the ladder.

2. The combination with a rolling ladder having wheels at the bottom, said ladder being movable up and down a limited distance with respect to said wheels, of a brake movable into and out of engagement with one of said wheels by the downward and upward movements, respectively, of said ladder.

3. In a device of the class described, a ladder having wheels at the bottom thereof adapted to travel on a floor, a brake movable into engagement with one of said wheels upon the application of the weight of an operator, and means for releasing the brake independent of the weight of the operator.

4. In a device of the class described, a ladder having wheels at the bottom thereof for supporting the ladder on a floor, a brake acting on one of said wheels when the ladder is weighted, and means for releasing said brake independent of said weight.

5. In combination with a rolling ladder having wheels at the bottom adapted to support the ladder on a floor, of a brake in engagement with one of said wheels when the weight of the operator is applied to the ladder, and means adapted to automatically disengage said brake from said wheel when the weight of the operator is removed therefrom.

6. In combination with a rolling ladder having wheels at the bottom adapted to travel on a floor, of a brake adapted to be applied to one of said wheels when said ladder is weighted and to be released when said weight is removed.

7. In combination with a rolling ladder having wheels adapted to travel on a floor, of a brake and a spring adapted to press said brake into engagement with one of said wheels when the ladder is supporting the weight of the operator but to release said brake when the weight of the operator is removed.

8. In combination with a rolling ladder having wheels at the bottom adapted to travel on a floor, of a spring associated with one of said wheels normally acting to force said wheel downwardly and yieldingly support said ladder thereby, the action of said spring being overcome when a weight is applied to the ladder, and a brake member with which said wheel engages when said spring is overcome by the application of a weight on the ladder.

9. In combination with a ladder, of a plate attached to the bottom of said ladder, a curved pivoted member mounted thereon, one end of said curved member carrying a wheel adapted to travel on a floor, a brake member also pivoted to said plate, a tension spring between the other end of said curved member and said brake acting to force said wheel downwardly and to draw said brake member towards said wheel, and a stop member to prevent said brake member from engaging said wheel when said wheel is in its downward position.

10. In combination with a rolling ladder having wheels adapted to travel on a floor, of a locking member engaging one of said wheels when the ladder is supporting the weight of the operator but released therefrom when the weight of the operator is removed.

11. In combination with a rolling ladder having wheels at the bottom adapted to travel on a floor, of a locking member adapted to be applied to prevent one of said wheels from revolving when said ladder is weighted and to be released when said weight is removed.

12. In combination with a truck having wheels adapted to travel on a floor, of a brake serving to secure the truck against movement, a ladder cooperating with the brake and intending to actuate it when weighted, and means for counterbalancing the weight of the ladder.

13. In combination with a carriage having wheels adapted to travel on a floor, of a ladder supported thereon having limited movement relative to said wheels, and a brake cooperating with one of said wheels upon the downward movement of the ladder on the carriage.

14. In combination with a truck or carriage having wheels adapted to travel on a floor, of a locking member mounted on the truck and movable into and out of engagement with one of said wheels, a ladder supported at its lower end by said truck, and means for normally counterbalancing the weight of the ladder and serving to hold the locking member out of engagement with said wheel.

15. In combination with a truck having wheels adapted to travel on a floor, and a ladder mounted on said truck at its lower end, of a brake associated with said truck and operating to secure the truck against movement when the ladder is weighted, means for normally holding the brake in inoperative position, and means for applying the brake when the ladder is weighted.

In witness whereof, I hereunto subscribe my name this 21st day of November, A. D. 1922.

LEON N. HAMPTON.